(12) United States Patent
Neumair

(10) Patent No.: US 6,202,685 B1
(45) Date of Patent: Mar. 20, 2001

(54) ELECTROHYDRAULIC CLAMPING MODULE

(75) Inventor: Georg Neumair, Thalhausen (DE)

(73) Assignee: Heilmeier & Weinlein Fabrik F. Oelhydraulic bmbH & Co. KG, Munich (DE)

( * ) Notice: Subject to any disclaimer, the term of this patent is extended or adjusted under 35 U.S.C. 154(b) by 0 days.

(21) Appl. No.: 09/301,959

(22) Filed: Apr. 29, 1999

(30) Foreign Application Priority Data

May 7, 1998 (DE) .......................................... 298 08 294 U

(51) Int. Cl.$^7$ ...................................................... F15B 13/04
(52) U.S. Cl. ............................. 137/596; 60/431; 91/446; 91/447
(58) Field of Search ................................. 60/431; 91/446, 91/447; 137/596

(56) References Cited

FOREIGN PATENT DOCUMENTS

| 32 04 055 | 8/1983 | (DE) . |
|---|---|---|
| 42 37 901 | 5/1994 | (DE) . |
| 44 46 538 | 6/1996 | (DE) . |
| 296 15 498 U | 10/1996 | (DE) . |
| WO 87/01171 | 2/1987 | (WO) . |

*Primary Examiner*—Gerald A. Michalsky
(74) *Attorney, Agent, or Firm*—Cook, Alex, McFarron, Manzo, Cummings & Mehler, Ltd.

(57) ABSTRACT

In an electrohydraulic clamping module for a clamping element of a tooling machine comprising a pressure regulating valve in a flow line towards said clamping element is provided for regulating the clamping pressure. A pressure surveying sensor is integrated into said pressure regulating valve surveying said clamping pressure. Said pressure regulating valve is a leakage-free seat valve having a closure member which can be moved in relation to a stationary valve seat and can be adjusted by means of a control piston which is displaceable by the regulated pressure downstream of said valve seat and in closing direction of said closure member counter to a regulating force. Said pressure surveying sensor can be actuated by said control piston.

12 Claims, 3 Drawing Sheets

ELECTROHYDRAULIC CLAMPING MODULE

Figure 1:
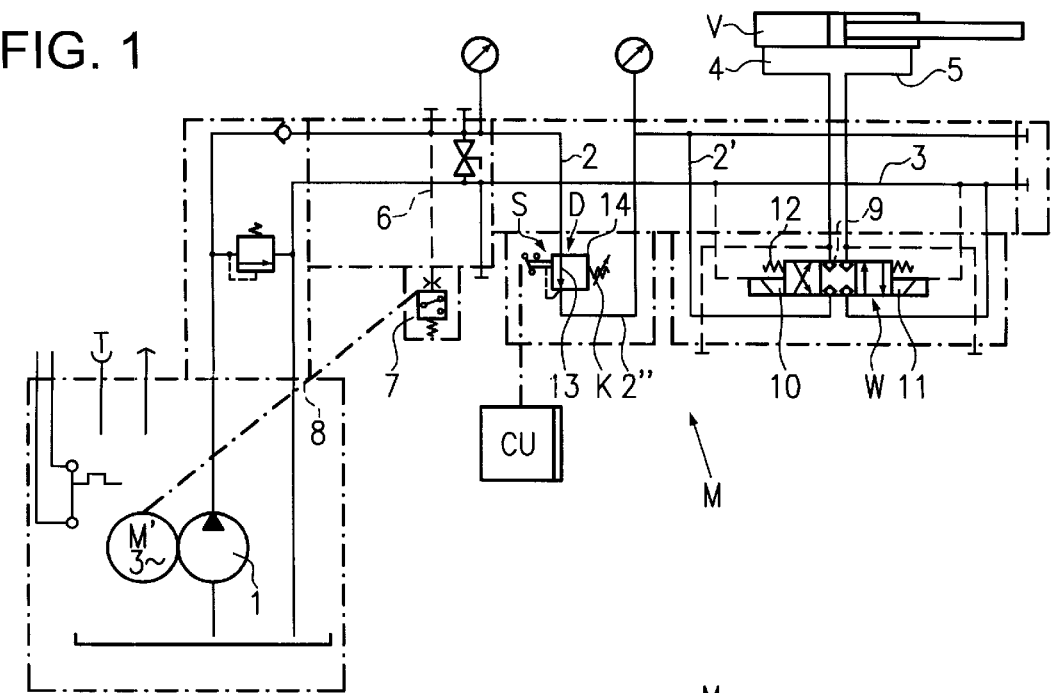

The invention relates to an electrohydraulic clamping module as disclosed in the following.

Similar clamping modules are known from DE 297 10 129 (FIG. 2), DE 297 10 127 and DE 297 10 128. The direction control valve responsible for controlling the direction of the clamping element is leakage-proof in its locking position. A separately provided electrical pressure switch is surveying the pressure in the pump line and is switching the pump on and off upon demand. The clamping pressure for the clamping element is regulated by means of a pilot controlled 3/2-pressure regulating valve having a slider valve design, to which within a pilot circuit, a safety valve and a pilot valve are associated, The pressure surveillance of the clamping pressure is carried out by a separate pressure difference valve actuated by the pilot pressure of the pilot valve and a reference pressure derived from the clamping pressure. Said pressure difference valve is co-operating with a switch. The pressure regulating portion of said clamping module is complicated. Leakages, e.g. towards the tank, occur in rest periods and during operation, e.g. in the 3/2-pressure regulating valve and lead, particularly in resting periods, to the effect that then the pump is frequently switched on and off via the pressure switch surveying the pressure line. For that reason a high capacity pump is needed.

DE 42 37 901 discloses a pressure reducing valve having an integrated pressure switch and serving as a clamping pressure regulating valve within a clamping module. The control piston, operating with leakage and like a slider without seat valve function leads during operation and its blocking position, particularly in case of high system pressure, to leakage, e.g. towards the tank, so that said pressure reducing valve cannot be used in a clamping module where leakage-proofness is needed. The control piston controlling the working flow is activating an electrical switch directly or indirectly by means of a parallel piston or cam mechanism, respectively.

A pressure reducing valve according to DE 296 15 498 allows pressure regulation independent from pressure variations of the non-regulated pressure since the control piston adjusting the closure member in relation to the valve seat only is displaced by the regulated pressure counter to the regulating force which regulating force is determining the value of the pressure which is to be regulated. Such pressure reducing valve designed as seat valves are used in high pressure hydraulic applications if beside the pressure regulation the requirement of a leakage-free or leakage-proof function has to be fulfilled, since seat valves contrary to slider valves even in their blocking position are leakage-proof. A surveillance of the regulated pressure is not provided.

Further prior art can be found in DE 44 46 538A, DE 32 04 955A, WO 87/01171A.

It is an object of the invention to provide a clamping module of the kind as disclosed at the beginning being structurally simple, leakage-proof and having a reliable pressure surveillance feature.

Said task can be achieved with the features hereinafter described.

Untypically for a clamping module as the pressure relating valve a simple and directly regulating seat valve is used without a connection to the tank (two-ways) which seat valve in connection with the leakage-proof directional control valve can avoid any leakages. A complicated pilot circuit operating with leakage is eliminated. Since with the directly regulating seat valve control piston actuated counter to the regulating force exclusively by the regulated pressure the pre-determined value of the regulated pressure always is reached at a certain position of the control piston, which position is independent from the magnitude of the selected regulating force, the pressure surveillance can be designed structurally simply when the control piston is used to actuate the pressure surveying sensor. Despite the structural simplification of the clamping module the necessity is avoided to readjust the pressure surveying sensor in case of a new adjustment of the value for the regulated pressure or the clamping pressure by varying the regulating force. Thanks to the leakage-proofness furthermore a compact pump or a precisely dimensioned pumping system (multiple stage pump) can be used. Particularly for tooling machines having a leakage-proof clamping device this is a fair price and optimal combination.

In a preferred embodiment the seat valve with its pressure surveying sensor is provided in the pump line branch of the respective directional control valve in order to survey the clamping pressure by means of its pressure surveying sensor already upstream of the directional control valve and for the clamping element controlled by it. Further consumers connected to the pump line can receive the unregulated pressure nevertheless.

In a further embodiment for all clamping elements connected to the same pump line the same regulated pressure is adjusted and surveyed centrally.

In a further embodiment not only the clamping pressure is regulated and surveyed in at least one consumer line of the clamping element, but even for a selected moving direction of the clamping element which direction might be critical in view to the clamping pressure. This leads to very strong signals for a higher ranking control unit of a tooling machine.

In a further embodiment upstream of the first directional control valve a pressure switch is connected to the pump line serving to switch on or off the pressure source. Due to the leakage-proofness of the directional control valve and/or the seat valve even with a simple design of the supply circuit it is avoided that the pump will be switched on and off during resting periods.

In a further embodiment the pressure surveying sensor is constituted by an electrical switch or microswitch which is actuated by means of the control piston via the mechanical coupling. Such switches are available for fair prices, are reliable and need only small mounting space. The control piston could even directly actuate the switch.

In a further embodiment the mechanical coupling is provided outside the working flow path such that it does not need specific sealing measures.

In an advantageous embodiment the switching point of the electrical switch is associated to the position of the control piston at which the value of the regulated pressure or an intentionally selected, somewhat lower pressure value will be reached, in order to transmit an okay-signal or a error-signal, respectively, to a higher ranking control unit. Said position at which the switch is switching is reached by the control piston independent from the value of the adjusted regulating force. Due to this the pressure surveying sensor does not need to be re-adjusted when changing the value of the regulated pressure by an adjustment of the regulating force.

Advantageously said regulating force is generated either by means of at least one regulating spring or by means of a proportional magnet. A proportional magnet generates the regulating force like a magnetic spring depending on its current supply.

In another embodiment the electrical switch is situated at an exterior side of the housing of the seat valve or sidewards of the component generating the regulating force. The plunger is connecting the control piston with an actuating element of the switch. This saves mounting space and is advantageous for manufacturing reasons.

Expediently the electrical switch or its actuating element is provided adjustably at the housing. Instead or additionally the effective length of the plunger can be varied. This simplifies the adjustment of the switching point.

An vital aspect of the invention of particular importance is the use of a seat valve being leakage-free at least in its blocking position and having an integrated pressure surveillance feature for the pressure regulation and for maintaining the regulated pressure in a clamping module of a tooling machine, such that the pressure surveillance feature automatically adapts to an intended change of the regulating force.

Figure 2:
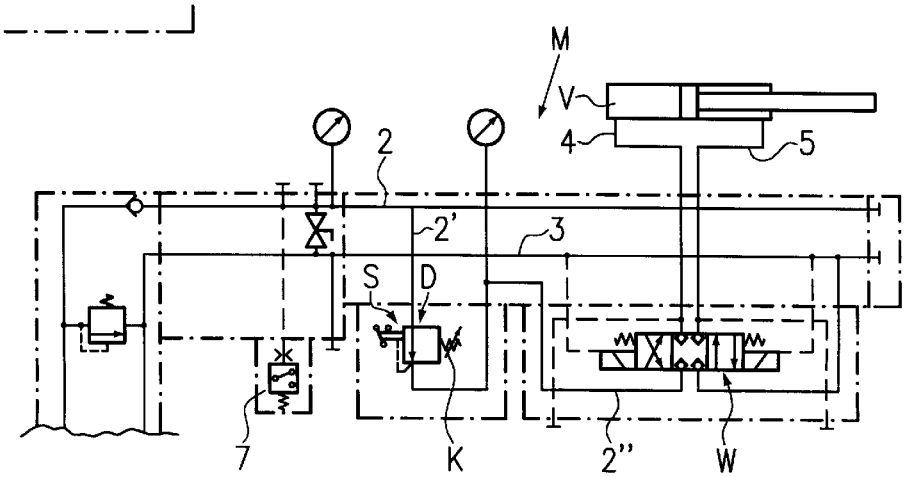
Figure 3:
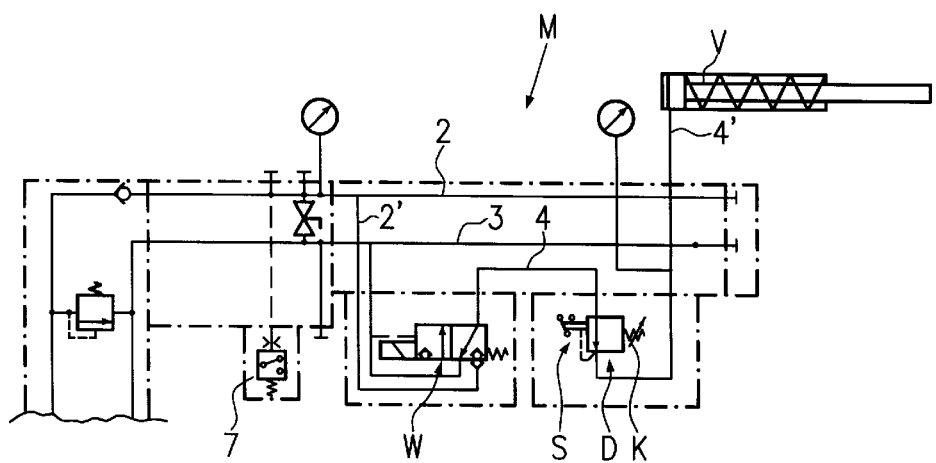
Figure 4:
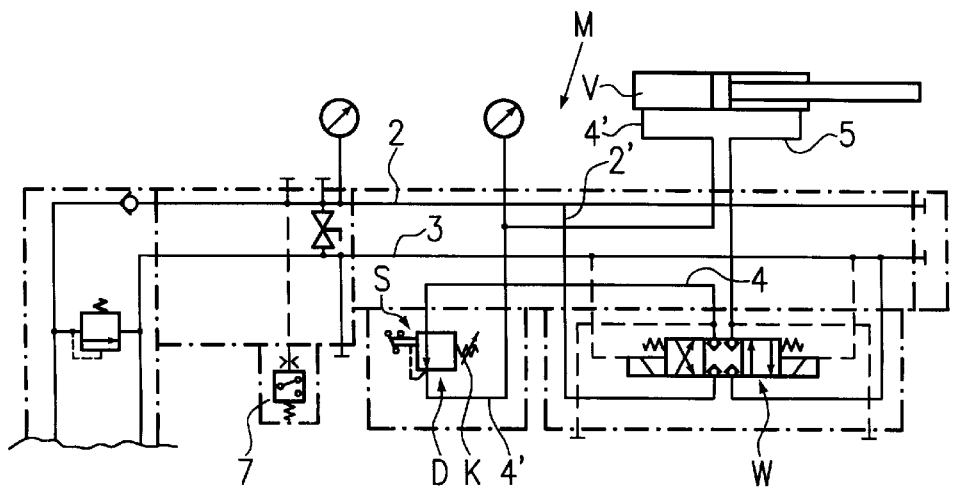
Figure 5:
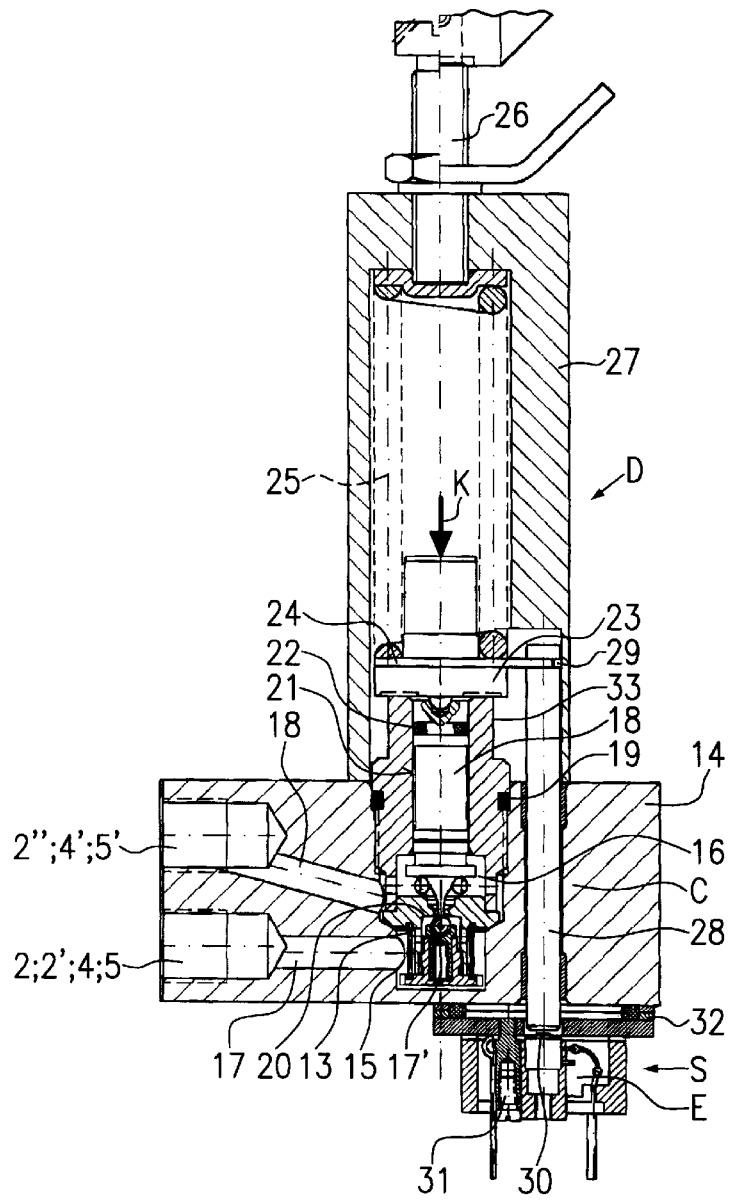
Figure 6:
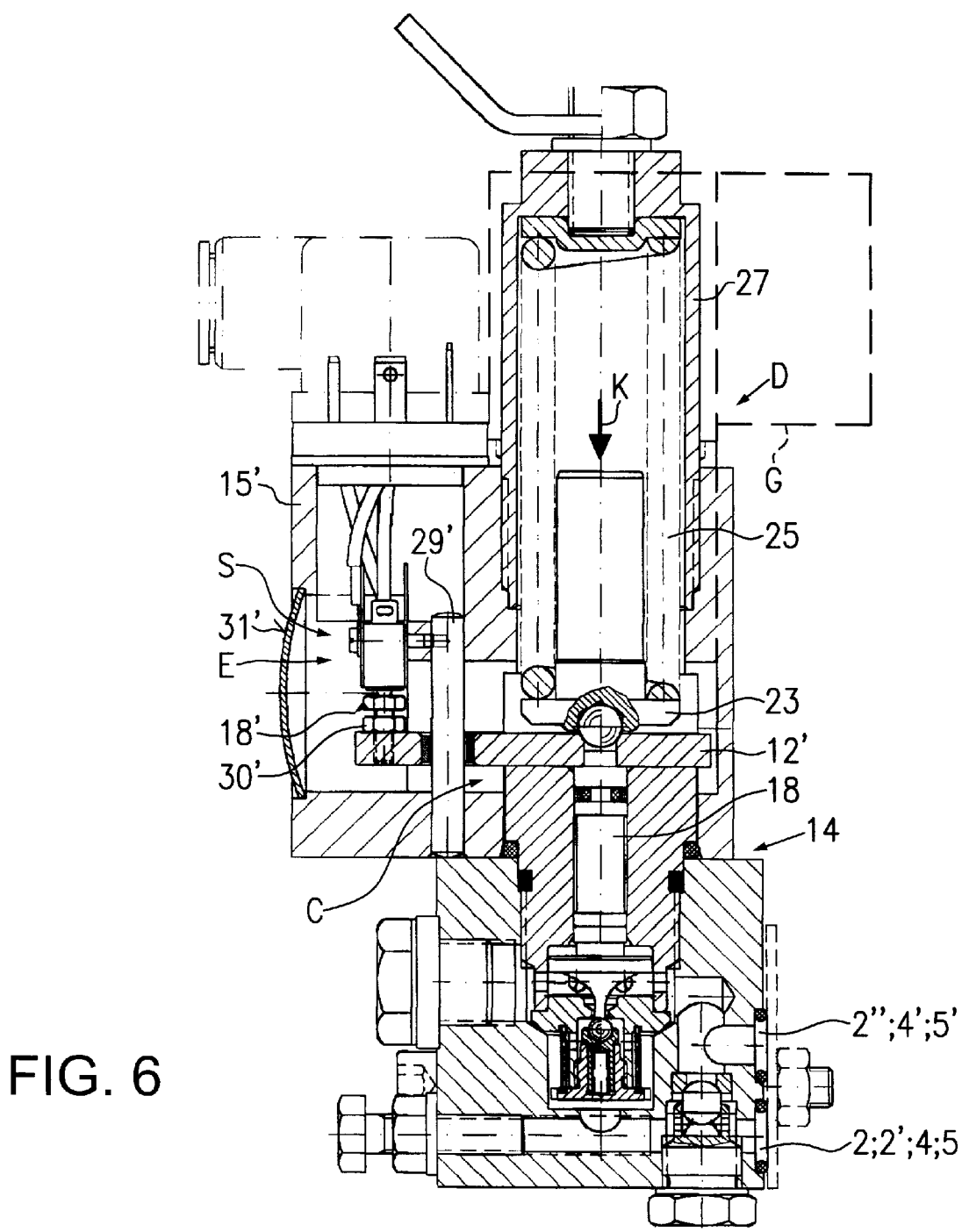

Embodiments of the subject of the invention will be explained with the help of the drawing. In the drawing is:

FIG. 1 An embodiment of an electrohydraulic clamping module for a tooling machine in the form of a block diagram, FIG. 2 A further embodiment in the form of a block diagram, FIG. 3 A further embodiment in the form of a block diagram, FIG. 4 A further embodiment in the form of a block diagram, FIG. 5 A longitudinal section of a pressure relating seat valve having a pressure surveying sensor and intended for clamping modules, e.g. as shown in the preceding figures, and FIG. 6 A longitudinal section of a further embodiment of said seat valve.

An electrohydraulic clamping module M for a tooling machine, e.g. a milling machine or a manufacturing centre, in FIG. 1 comprises a pressure line 2 supplied by a pump 1 driven by motor M' as well as a return line 3. In pressure or pump line 2 seat valve 14 is provided serving as a pressure regulating valve D including a pressure surveying sensor S. Said seat valve 14 is not connected with the return line and is generally operating leakage-free and at least in its blocking position is leakage-free. Said seat valve 14 contains a valve closure member 13 actuated by a regulating force K. Said pressure closure member 13 adjusts a regulated pressure in a pump line branch 2" by means of unregulated pressure provided by pump 1. The pressure value of said regulated pressure is depending on said regulating force K. A pump line branch 2' branches off from pump line section 2" and leads to a port P of a 4/3 directional control valve W designed as a seat valve as well, a port R of which is connected with return line 3. Consumer lines 4, 5 of a preferably leakage-free clamping element V of the clamping device are connected with ports A, B of directional control valve W. The seat valve character of the directional control valve W is symbolically indicated at 9. This means that in the shown blocking position of directional control valve W adjusted by springs 12, both consumer lines 4, 5 are blocked leakage-free. The directional control valve W serves to control the moving direction of clamping element V. The control positions of said directional control valve W are initiated by magnets 10, 11.

Said pressure surveying sensor S, e.g. is an electrical switch generating a signal for a higher ranking control unit C, U which is then controlling further operating steps of the clamping module. Said signal is generated when the value of the regulated pressure is reached or when a value is reached which is lower by a predetermined difference of, e.g. 10 bar below the adjusted value of the regulated pressure.

Upstream of pressure regulating valve D and via a control line 6 a pressure switch 7 is connected to pump line 2. Pressure switch 7 is in switching connection 8 with the motor M' of pump 1. By means of pressure switch 7, which is responding to a predetermined pressure value higher than the value of the regulated pressure, said pump 1 is switched off when said predetermined pressure is reached. Said pump 1 is switched on as long as said predetermined pressure is not reached. In case that there are further consumers connected to pump line section 2" they are supplied in this case also with the regulated pressure.

In the embodiment of the clamping module M in FIG. 2 pressure regulating valve D, in this case also a leakage-free seat valve, is provided between pump line branches 2' and 2". Pump line branch 2" leads to port P of directional control valve W. The respective consumer line pressure in consumer lines 4, 5 is adjusted by means of pressure regulating valve D. Reaching the value of the regulated pressure or a somewhat lower value is registered by a signal of the pressure surveying sensor S. In case that further consumers are connected to pump line 2 they will be supplied with the unregulated pressure instead.

The pressure in pump line 2 may, as in FIG. 1, be surveyed and controlled by a pressure switch 7 serving to switch on and switch off the pump.

In the clamping module M of FIG. 3 the clamping element V is a unidirectional actuated cylinder operating counter to spring force. Directional control valve W is a 3/2-directional control valve having a leakage-free seat valve function. Between consumer line sections 4 and 4' said pressure regulating valve D is provided, being a leakage-free seat valve and including pressure surveying sensor S. The pressure for extending the clamping element V is regulated and surveyed. Pressure switch 7 may serve to switch on and switch off the pump.

In the clamping module M of FIG. 4 the clamping element V is a bidirectional actuated hydraulic cylinder. Said pressure regulating valve D in form of a seat valve having an associated 2 pressure surveying sensor S is provided between consumer line sections 4, 4' in order to regulate and survey the pressure actuating said clamping element V in extension direction. The respective other consumer line 5 is connecting port B of directional control valve W (in seat valve design) directly with clamping element V. It is possible to provide said pressure regulating valve D with its pressure surveying sensor S in said other consumer line 5 or to equip both consumer lines 4, 5 each with a respective pressure regulating valve D (preferably with sensors S adjusted for different pressure values). The directional control valve W is connected by means of pump line branch 2' to pump line 2 so that further, not shown, consumers are supplied with unregulated pressure. Pump line 2 is surveyed by pressure switch 7 serving to switch on and switch off the pump.

In FIG. 5 the pressure regulating valve D as only shown schematically in FIGS. 1 to 4 is shown in a vertical section and with its design as a seat valve 14 including pressure surveying sensor S. Said seat valve 14 has a first chamber 15 in its housing 14 as well as a second chamber 16 separated from first chamber 15 by a valve seat 20. According to the block diagrams of FIGS. 1 to 4 first chamber 15 is connected via a passage 17 with pump line 2, pump line section 2' or consumer line 4 or 5, respectively. Second chamber 16 is connected via a passage 18 with pump line section 2" or consumer line section 4' or 5', respectively. In the embodiments of FIGS. 3 and 4 the housing of the pressure regulating valve D could be mounted directly to the housing of the directional control valve or could even define a part of its housing.

The valve closure member 13 in the shown embodiment of FIG. 5 is a ball supported by a guiding and damping device 17 in said first chamber 15.

In said second chamber 16 a control piston 18 is provided the actuation area of which is larger than the cross-sectional area of valve seat 20. Said control piston 18 is leakage-free displaceably guided in a guiding bore 21 and is sealed by sealing 22. Guiding bore 21 opens into second chamber 16. Control piston 18 is actuated by the pressure being present in the second chamber 16. At the lower end of control piston 18 a plunger 19 is provided extending with radial clearance through valve seat 20 for engagement with closure member 13. Said guiding bore 21, e.g. is received in a sleeve 33 screwed in to second chamber 16 from above. The free end of sleeve 33 is defining a stroke limit for the deepest position of control piston 18 corresponding to the largest opening position of closure member 13.

Said regulating force K is transmitted by means of a counterfort part 23, preferably with an intermediate plate 24, to control piston 18. It originates in the shown embodiment from of at least one regulating spring 25 received in a cap 27 seated on said housing. The pretension of regulating spring 25 can be varied by means of a mechanism 26. Instead of a regulating spring 25 a proportional magnet G (FIG. 6) may be provided which is adjusting and holding the regulating force depending on current supply.

Said pressure surveying sensor S is connected with control piston 18 via a mechanical coupling C. Said pressure surveying sensor S, e.g. is an electrical switch E, preferably a microswitch, having an actuation element 30. Said electrical switch is secured at the outer side of housing by means of an adjustment screw 31 and/or with washerlike spacer parts 32 such that the switching point of electrical switch E can be adjusted at will. Said mechanical coupling has a plunger 28 penetrating the housing parallel to control piston 18. Said plunger is aligned with the actuating element 30 of electrical switch E and is coupled by means of a groove 29 with said intermediate plate 24 of counterfort part 23, 24. Said plunger 25 is received in a bore of the housing of seat valve 14 and is easily movably guided in plain bearings without play.

In FIG. 5 the seat valve 14 is shown is pressureless condition and with maximum opening position of closure member 15. Regulating spring 25 is adjusted to a predetermined pressure value. In case that pressure builds up in first chamber 15 said pressure first is transmitted through valve seat 20 into second chamber 16. Said control piston 18 is actuated by said pressure counter to regulating force K. With the pressure increasing in second chamber 16 said control piston 18 is pushed counter to the regulating force K upwardly until finally and as soon as the adjusted value of the regulated pressure is reached said closure member 15 comes into abutment at valve seat 20. Then the pressure in second chamber 16 cannot increase further. In case that due to consumption the pressure in second chamber 16 should decrease, then via plunger 19 of control piston 18 and by said regulating force K the closure member 13 is moved away from valve seat 20 in order to readjust the value of the regulated pressure. Plunger 28 is following any movements of control piston 18. Until reaching the value of the regulated pressure the actuating element 30, e.g. is pressed, so that the electric switch E does not output any signal. As soon as the value of the regulated pressure as adjusted by regulating force K is reached the electric switch E is switching in order to output an okay-signal and to transmit said signal to the higher ranking control unit CU. Advantageously the switching point of the electric switch E is not adjusted exactly to the selected value of the regulated pressure, but to a value which is slightly lower, e.g. lower by about 10 bar. Said pressure difference of, e.g. 10 bar will be maintained within the entire adjustment range of regulating spring 25 when generating the signal by the electrical switch since the control piston 18 permanently will reach identically the same position independent from the force value of regulating spring 25 as soon as the value of the regulated pressure has been reached or a value which is lower by, e.g. 10 bar.

In order to exclude a hammering of the 2/2-seat valve during its regulating operation a not shown damping device for the stroke motion of the control piston 18, at least in one stroke direction, might be provided.

Said pressure surveying sensor S instead could mounted within the housing or directly at counterfort part 23, 24.

In the embodiment of FIG. 6 said electric switch E serving to survey the pressure is mounted or added sidewards of the regulating spring 25 generating said regulating force K, namely in a cavity of a housing part 15'. Said electric switch E can e.g. be mounted in a fixed position. Said coupling C, constituted by counterfort 12' and plunger 18', extends sidewards of control piston 18 and upwardly. The outer and the side surfaces of the housing of seat valve 14 are left free for mounting reasons. A pin 29' in housing part 15' constitutes a rotational safety means for coupling C. Plunger 18' is longitudinally adjustable like an adjustment screw with counter nuts 30' in order to allow to adjust the switching point of electric switch E precisely. In housing part 15' in a window a removable cover 31' is provided. Instead of regulating spring 25 a proportional magnet G (indicated by dotted lines) could generate the regulating force K depending on its current supply. The function of seat valve 14 or pressure regulating valve D corresponds to the functions as already explained.

What is claimed is:

1. Electrohydraulic clamping module (M) for at least one hydraulic clamping element (V) of a tooling machine including at least one directional control valve (W) with leakage-free seat valve function in blocking position and being connected to a pump line and a return line (2, 3), at least one consumer line (4, 5) of said clamping element (V) being connected to the exit side of said directional control valve (W), at least one pressure regulating valve (D) for regulating said consumer line pressure at an adjustable value, said pressure regulating valve (D) being provided in a flow path from said pump line (2) towards said clamping element (V), and an electric pressure surveying sensor (S) for said regulated pressure being associated with said pressure regulating valve (D), characterized in that said pressure regulating valve (D) is a leakage-free operating seat valve (14) having a closure member (13) being movable in relation to a stationary valve seat (20), said closure member (13) being displaceable by means of a control piston (18) which itself is displaceable by means of said regulated pressure downstream of valve seat (20) and in closing direction of closure member (13) counter to a regulating force (K), and that said pressure surveying sensor (S) is actuated by said control piston (18) of said seat valve (14); said pressure surveying sensor (S) is an electric switch (E) having an actuating element (30) and a motion transmitting mechanical coupling (C) is provided between said control piston (18) and said actuating element (30).

2. Clamping module as in claim 1, characterised in that said seat valve (14) with its pressure surveying sensor (S) is provided in a pump line (2') leading to directional control valve (W) and upstream of said directional control valve (W).

3. Clamping module as in claim 1, characterised in that said seat valve (14) with its pressure surveying sensor (S) is provided in at least one of said consumer lines (4, 5) and downstream of said directional control valve (W).

4. Clamping module as in claim 1, characterised in that said mechanical coupling (C) is provided outside of the working flow path in seat valve (14).

5. Clamping module as in claim 1, characterised in that said regulating force (K) is generated for said control piston (18) by means of at least one regulating spring (25).

6. Clamping module as in claim 1, characterised in that said electric switch (E) is mounted to an outer surface of a housing of said seat valve (14) and that said mechanical coupling (C) contains a plunger (28, 18') displaceably parallel to control piston (18) which plunger is aligned with said actuating element (30) of said electric switch (E).

7. Clamping module of claim 1 characterized in that a pump (1) supplies said pump line (2), and an electric pressure switch (7) is connected to said pump line (2) to turn said pump (1) on and off.

8. Clamping module as in claim 1, characterized in that a switch point of said electrical switch (E) is adjusted to the position of said control piston (18) when said adjusted value of regulated pressure is reached, said position of said control piston (18) being independent of the adjusted value of said regulating force (K).

9. Clamping module as in claim 8, characterized in that said switch point of said electric switch (E) is adjusted by adjusting said actuating element (30).

10. Clamping module as in claim 8, characterized in that said switch point of said electric switch (E) is adjusted by adjusting the effective longitudinal extension of a plunger (18').

11. Clamping module as in claim 1, characterized by a switch point of said electrical switch (E) being adjusted to the position of said control piston (18) when a selected value lower than said adjusted value of said regulated pressure is reached, said position of said control piston (18) being independent of the adjusted value of said regulating force (K).

12. Clamping mechanism as in claim 1, characterized in that said regulating force (K) is generated for said control piston (18) by means of at least one proportional magnet (G).

* * * * *